(12) United States Patent
Götz et al.

(10) Patent No.: US 10,313,268 B2
(45) Date of Patent: Jun. 4, 2019

(54) NETWORK ARRANGEMENT AND METHOD PRIORITIZATION OF REAL-TIME TELEGRAMS IN A CONVERGENT NETWORK

(71) Applicant: Siemens Aktiengesellschaft, Munich (DE)

(72) Inventors: Franz-Josef Götz, Heideck (DE); Dieter Klotz, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 84 days.

(21) Appl. No.: 14/930,379

(22) Filed: Nov. 2, 2015

(65) Prior Publication Data
US 2016/0127268 A1 May 5, 2016

(30) Foreign Application Priority Data

Nov. 4, 2014 (EP) .................................... 14191638

(51) Int. Cl.
*H04L 12/28* (2006.01)
*H04L 12/933* (2013.01)
(Continued)

(52) U.S. Cl.
CPC .............. *H04L 49/15* (2013.01); *H04L 45/42* (2013.01); *H04W 72/1247* (2013.01)

(58) Field of Classification Search
CPC .... H04L 49/15; H04L 45/42; H04W 72/1247; H04W 92/02; H04W 92/045
See application file for complete search history.

(56) References Cited

U.S. PATENT DOCUMENTS

| 5,917,312 A | 6/1999 | Brkovic |
| 6,424,129 B1 | 7/2002 | Lethellier |
| (Continued) | | |

FOREIGN PATENT DOCUMENTS

| CN | 1682504 | 10/2005 |
| CN | 1684440 | 10/2005 |
| (Continued) | | |

OTHER PUBLICATIONS

Office Action dated Sep. 5, 2017 which issued in the corresponding Chinese Patent Application No. 2015107325352.

*Primary Examiner* — Abdelnabi O Musa
(74) *Attorney, Agent, or Firm* — Cozen O'Connor

(57) ABSTRACT

A method for the prioritization of real-time telegrams in a convergent network, in particular in an industrial network and/or a "time-sensitive network" (TSN), wherein the convergent network has a central distribution infrastructure and a decentralized distribution infrastructure, and within the convergent network a service sends and/or receives real-time telegrams, and wherein the convergent network has a switching node forming a central network node for connection of central distribution infrastructure and decentralized distribution infrastructure, and which has a coupling port via which the switching node is connected to the decentralized distribution infrastructure, wherein the switching node has central network ports via which the switching node is integrated into the central distribution infrastructure, where real-time telegrams received at central network ports of the switching nodes are assigned a higher priority level than the real-time telegrams received at the coupling ports so as to provide efficient prioritization of real-time telegrams.

15 Claims, 3 Drawing Sheets

(51) Int. Cl.
*H04L 12/717* (2013.01)
*H04W 72/12* (2009.01)

(56) References Cited

U.S. PATENT DOCUMENTS

| | | | |
|---|---|---|---|
| 8,060,672 B2 * | 11/2011 | Maul | G06F 13/426 370/232 |
| 8,391,255 B2 | 3/2013 | Ribiere et al. | |
| 2003/0185249 A1 * | 10/2003 | Davies | H04L 12/40143 370/535 |
| 2004/0217878 A1 * | 11/2004 | Feld | H04L 47/10 340/286.02 |
| 2004/0233905 A1 * | 11/2004 | Weber | H04L 12/417 370/389 |
| 2004/0246988 A1 * | 12/2004 | Bruckner | H04L 67/2819 370/465 |
| 2005/0237973 A1 | 10/2005 | Takeda et al. | |
| 2006/0018327 A1 | 1/2006 | Brueckner et al. | |
| 2006/0109866 A1 * | 5/2006 | Janssen | H04L 12/40156 370/493 |
| 2008/0043638 A1 | 2/2008 | Ribiere et al. | |
| 2009/0163136 A1 | 6/2009 | Wienold et al. | |
| 2010/0111082 A1 * | 5/2010 | Janssen | H04L 12/4625 370/389 |
| 2010/0208586 A1 * | 8/2010 | Papenfort | G05B 19/4186 370/230 |
| 2011/0156687 A1 | 6/2011 | Gardner et al. | |
| 2013/0154595 A1 | 6/2013 | Drinovsky | |

FOREIGN PATENT DOCUMENTS

| | | |
|---|---|---|
| EP | 1 587 262 | 10/2005 |
| WO | WO 2008/021627 | 2/2008 |

* cited by examiner

NETWORK ARRANGEMENT AND METHOD PRIORITIZATION OF REAL-TIME TELEGRAMS IN A CONVERGENT NETWORK

BACKGROUND OF THE INVENTION

1. Field of the Invention

The invention relates to a network arrangement, network device and method for the prioritization of real-time telegrams in a convergent network, in particular in an industrial network, wherein the convergent network has at least one central distribution infrastructure and at least one decentralized distribution infrastructure and wherein in the convergent network at least one service sends and/or receives real-time telegrams, and wherein the convergent network has at least one switching node which is a central network node for the connection of central distribution infrastructure and decentralized distribution infrastructure, and which has at least one coupling port via which the switching node is connected to the decentralized distribution infrastructure, wherein the switching node has a central network port via which the switching node is incorporated into the central distribution infrastructure.

2. Description of the Related Art

Prioritization methods can be used in many industrial sectors, in particular in the automation and automobile industry and in the energy sector where there is a requirement for communication networks to be appropriate for all communication services throughout the plant, from fieldbus level through to business level, based on the a single standardized protocol. Such a communication network is also described as a convergent network in which various services and real-time services can be realized. Such networks are also described as convergent "time-sensitive networks" (TSN). Communication based on the Ethernet protocol can be mentioned here as an example of this in the industrial sector.

A central distribution infrastructure, also known as a backbone, is the central part of the convergent network. The majority of the data is distributed to the corresponding decentralized distribution infrastructures via this central distribution infrastructure. The backbone may also consist of a number of independent or interconnected central distribution infrastructures. As a rule, the performance of the central distribution infrastructure (of the backbone) is significantly higher than that of decentralized distribution infrastructures. In addition, corresponding redundancies may be provided in the central distribution infrastructure.

The coexistence of various services results in several challenges. These services include cyclic data traffic, such as the continuous transfer of control data (also control data streams or CD streams) and audio-video streams (also AV streams) and acyclic data traffic, such as best effort traffic (BE traffic), which should be transferred at the best speed currently possible for this service.

In spite of the coexistence of a number of services in the same network, for real-time services, such as for industrial control systems and their real-time telegrams, for each path between a control device and terminal equipment, predefined requirements such as minimum delay times (low latency), minimum deviations from the operating cycle and minimum deviations in the runtime of data packets (low jitter) must be met and furthermore, adequate bandwidth and sufficient resources must be available. Requirements such as these are generally summarized under "quality of service" (QoS). These requirements must also be met when a number of real-time services access a common central distribution infrastructure.

Hitherto, ingress policing at the input ports and egress policing at the output ports have prevented cyclic data streams, such as CD streams or AV streams, from using more than the bandwidth reserved for them via known mechanisms such as leaky bucket. If, for example, a data stream has used its reserved bandwidth, then its telegrams are deleted for a certain period of time. Thus, the greater data load at a switching node has been taken into account hitherto compared with the coupling ports at the central network ports (also backbone ports). Switching nodes are the network nodes or distributors which connect the central distribution infrastructure to the decentralized distribution infrastructures, coupling ports are the ports at which a decentralized distribution infrastructure is connected to the switching node.

Hitherto, with the known policing mechanisms (e.g. leaky bucket) more bandwidth has been reserved for real-time services at the central network ports than for real-time services at the coupling ports. If the respective bandwidth reserved is not used, unnecessary reserves may exist, which can be uneconomical. However, if the reserved bandwidth is used, real-time telegrams of this service are deleted for a period of time and the guaranteed and timely delivery of telegrams can no longer be ensured. The "Quality of Service" requirements cannot be met thus either.

SUMMARY OF THE INVENTION

It is therefore an object of the present invention is provide a method, a network arrangement and a network station with which real-time telegrams can be efficiently prioritized.

This and other objects and advantages are achieved in accordance with the invention by a method in which the real-time telegrams that are received at central network ports of the switching nodes are assigned a higher level of priority than the real-time telegrams that are received at the coupling ports.

The invention is based on the knowledge that port-specific prioritization significantly improves transfer, taking into account the varying data load at the ports of a coupling node with real-time services, such as with control data traffic (CD traffic). This results in minimized delay times, less jitter, more bandwidth and smaller resource requirements in the network nodes of a central network connection.

Thus, real-time telegrams are sent to the recipient in a timely and predictable manner and, at the same time, the available bandwidth is maximized for additional services and "quality of service" can be guaranteed. It does not matter whether these telegrams are sent via a decentralized distribution infrastructure with a low volume of data or via a central distribution infrastructure with a higher volume of data. It is also advantageous that real-time telegrams in the backbone are given greater importance and can thus pass through the backbone faster.

In an additional advantageous embodiment, the real-time telegrams that are received at the coupling port are assigned a lower priority level than the real-time telegrams that are received at the central network ports of the switching nodes. As a result, greater account is taken of the data throughput in the central distribution infrastructure being significantly higher than the data throughput in the decentralized parts of the network in most cases. Likewise, real-time telegrams that have already been forwarded in the central distribution infrastructure also avoid being thwarted by a random additional new real-time telegram with the same priority level in this switching node. Furthermore, it is thus ensured that real-time telegrams are not assigned an unnecessarily high priority which would result in resource bottlenecks in the central distribution infrastructure.

In a further advantageous embodiment, the real-time telegrams at additional central network ports are assigned the next priority level up, respectively. The particular advantage of this is that real-time telegrams that have to traverse particularly long paths in the central distribution infrastructure are forwarded with increasing priority. If the real-time telegrams have reached the highest priority level, they cannot be prioritized any higher. Which ports perform this additional prioritization depends on various factors. The physical structure of the central distribution infrastructure has an influence on this inasmuch as, for example, corresponding measures can already be taken in the run-up or when a problem is detected for central network ports that constitute a bottleneck or a connection of a long network path. Prioritization before these critical ports or even prioritization by these critical ports is conceivable here.

In an additional advantageous embodiment, the priority level of the real-time telegrams is dynamically assigned. Depending on which entity sets the dynamic, it is thus possible to respond to altered conditions with corresponding speed. An increase in production capacity, for example, may also be combined with an expansion of the network and an increased number of stations sending and/or receiving real-time telegrams. One or more entities in the network arrangement should therefore be able to adjust the priorities for assignment. For example, a central network distributor in the central distribution infrastructure can assume this task and synchronize the respective priority levels applicable to all the other devices.

It is furthermore conceivable that the priority levels of this network arrangement originate from a cyber-physical system. Industry 4.0-compliant production is thereby enabled, in which not only is production networked but engineering and even sourcing are also linked. Thus, for example, small batches can be produced more efficiently.

The current network load may be an additional criterion for assignment of the priority levels of real-time telegrams. Assigning the priority level according to the load has the advantage of enabling an immediate response to daily load fluctuations in the convergent network. These load fluctuations include, among other things, the start of shifts in production or the initial transfer of production data including testing of the equipment for the start-up of new series production.

It is particularly advantageous if real-time telegrams are prioritized by the respective receiving network port. This ensures that real-time telegrams are always prioritized immediately and without further delay. This saves resources and reduces the transfer time.

It is also an object of the invention to provide a network arrangement for performance of the method, where the network arrangement has at least one central distribution infrastructure with at least one switching node, and at least one decentralized distribution infrastructure. The number of decentralized distribution infrastructures may depend on the performance or simply the size of the central distribution infrastructure and is also dependent on the respective application.

It is particularly advantageous if the central distribution infrastructure has a ring structure. Redundancy is already incorporated here in the event of failure of a network connection without redundancy of the individual central network connections. The real-time telegram can always select the shortest route and in the event of failure of a central network connection, select the corresponding, possible path via the network connections which are still intact. Here, the method in accordance with the invention and the network structure complement each other ideally.

In an additional embodiment, the central distribution infrastructure essentially has a comb-like structure. The method in accordance with the invention is particularly advantageous in this structure as the central distribution infrastructure resembles that of a fieldbus and efficient prioritization of real-time telegrams in accordance with the method of the invention is therefore of great importance.

An embodiment in which the network arrangement is part of an industrial automation system or can be connected thereto is particularly advantageous. In this environment, real-time services are often associated with security-critical functions. Particularly in the industrial sector, it is therefore of the utmost importance to realize the advantages of the method in accordance with the invention, such as maximizing the bandwidth for additional services and guaranteed "quality of service".

Network devices which are suitable for performance of the method have the major advantage that it is possible to ensure that real-time telegrams are transferred with the necessary priority or the raised priority in the central distribution infrastructure over the entire convergent network. For example, mention may be made here of managed switches or hubs that themselves or the ports of which can undertake prioritization in accordance with the invention. Routers, network adapters in the sense of a network expansion of a device that would not otherwise be network-compatible or additional network distributors may also be used here.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained and clarified in more detail hereinafter with reference to the exemplary embodiments shown in the figures, in which.

DETAILED DESCRIPTION OF THE PRESENTLY EXEMPLARY EMBODIMENTS

Figure 1:
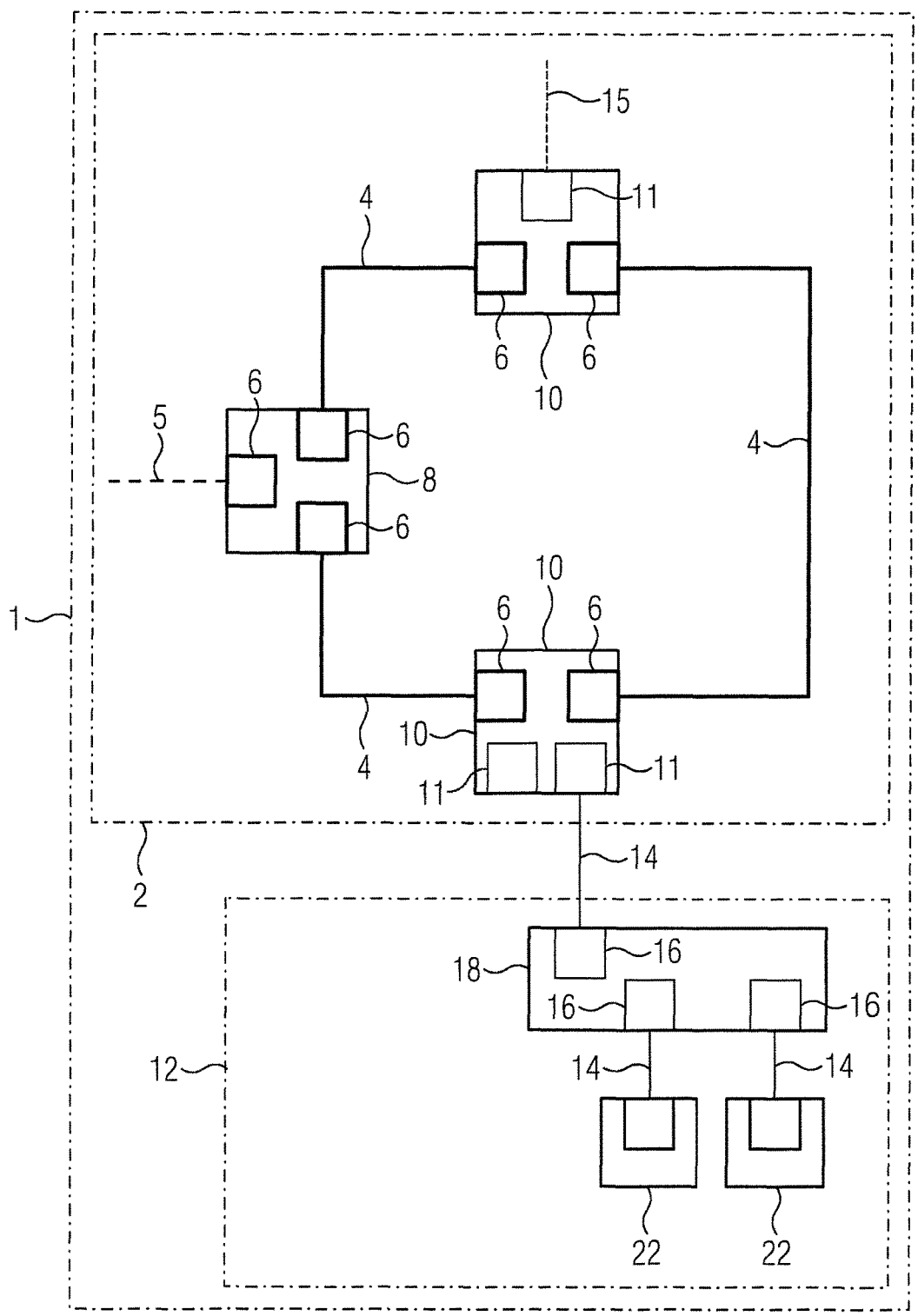
FIG. 1 shows convergent network arrangement with a central distribution infrastructure in a ring structure.

FIG. 1 shows a preferred embodiment of a convergent network 1 which comprises a central distribution infrastructure 2 and in this case a decentralized distribution infrastructure 12. The possible central and decentralized network connections 5 and 15 indicate that the convergent network 1 can be expanded in additional embodiments to include additional central and decentralized network connections 4 and 14, as well as the associated distribution infrastructures 2 and 12. In this embodiment, the central distribution infrastructure 2 has a ring structure and comprises central network connections 4, switching nodes 10, which form the interface between the central distribution infrastructure 2 and the decentralized distribution infrastructure 12 via the coupling ports 11, and a central network node 8 which acts as a distributor within the central distribution infrastructure 2. The ring structure comes about as a result of the central network nodes 8 and the switching nodes 10 each being connected to their neighbors via a central network connection. In the event of the failure of a central network connection, telegrams can select the other direction in the ring respectively. Central network connections 4 need not comprise a single, physical network connection but may by all means have redundancies. A wireless or even virtual realization of the network connections 4 and 14 is also feasible.

The lower switching node 10 is connected via a coupling port 11, which in turn is a kind of decentralized network port 16, and a decentralized network connection 14 to the decentralized network port 16 of a decentralized network distributor 18. The decentralized network connections 14 need not comprise a single, physical network connection but may by all means have redundancies. Two network devices 22 are in turn linked to the decentralized network distributor 18 in this case. The network devices 22 may, for example, be PCs in the development department or in production planning. However, they may equally be industrial control systems in production, which send and receive real-time telegrams.

In this embodiment, real-time telegrams that are received at central network ports 6 of the switching nodes 10 are now assigned a higher priority level 30, not shown in this figure, than the real-time telegrams that are received at the coupling ports 11. The background to this is that although selection of sufficiently high priority levels 30 for real-time telegrams is possible in the decentralized distribution infrastructure 12, the transition to the central distribution infrastructure 2 involves a completely different data load. If several services send and/or receive real-time telegrams via the central distribution infrastructure 2, if the priority is not changed this may result in too much time elapsing before a specific real-time telegram is forwarded and the object of the invention, in other words the efficient prioritization of real-time telegrams, therefore not being achieved. By prioritizing real-time telegrams in the central distribution infrastructure, overcapacities can thus be avoided and a very high level of reliability is achieved at the same time.

Figure 2:
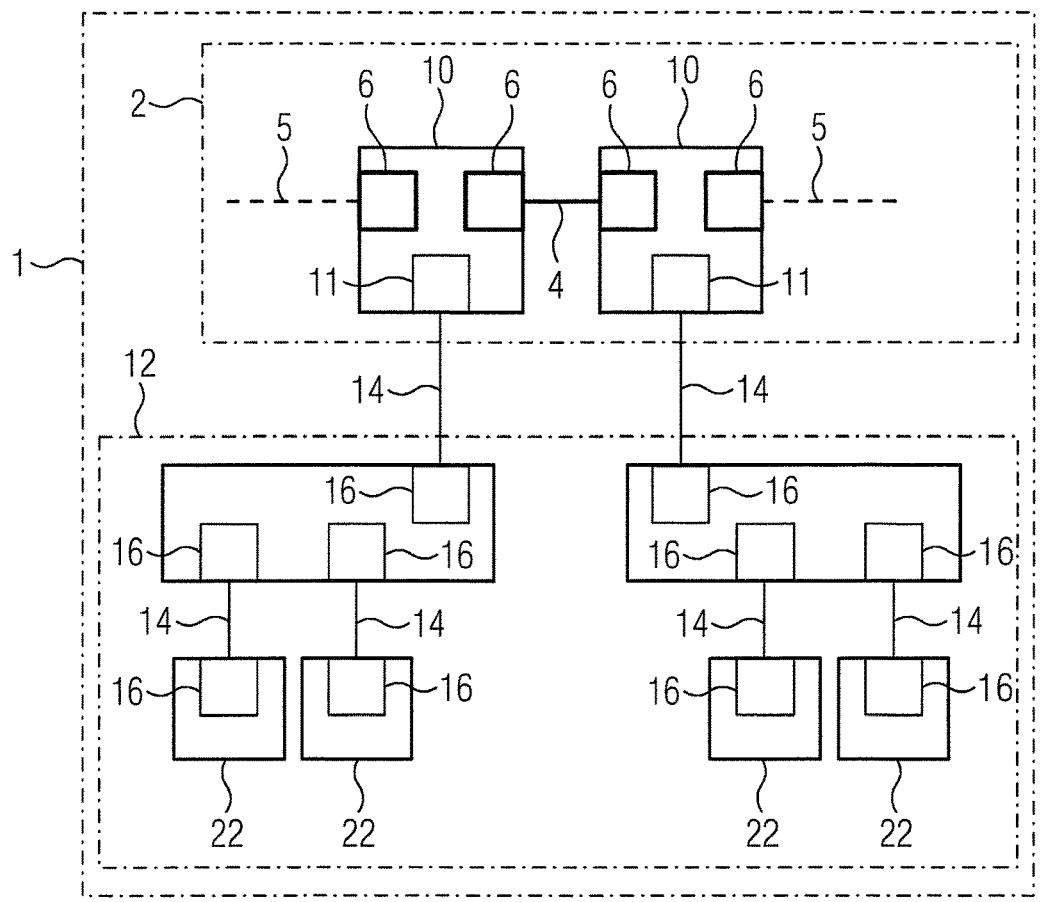
FIG. 2 shows convergent network arrangement with a central distribution infrastructure in a comb structure.

Using the reference characters known from FIG. 1, FIG. 2 shows a convergent network 1 comprising one central distribution infrastructure 2 and two decentralized distribution infrastructures 12. The network structure shown is also known as a "comb structure". Here, the central network connections 4 may also have redundancies. With regard to the function and the prioritization of real-time telegrams, in order to avoid repetition reference is made to the explanations for FIG. 1.

Figure 3:
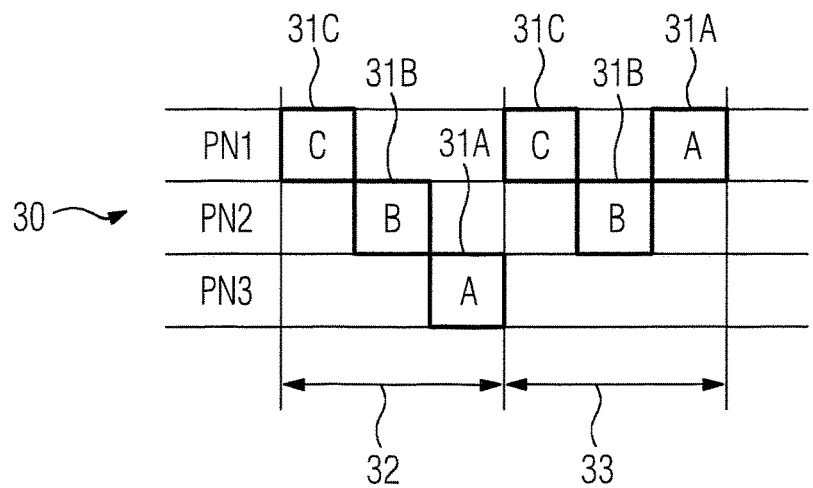
FIG. 3 shows two exemplary operating cycles with various services and priority levels.

FIG. 3 shows a diagrammatic and exemplary view of the priority level 30 and the various levels that it depicts. There are three priority levels in this exemplary embodiment, the highest priority level PN1, the medium priority level PN2 and the lowest priority level PN3. The priority levels 30 of telegrams 31 of the services A, B, C are shown during an operating cycle 32 and an operating cycle 33. In the operating cycle 32, the telegram 31C is already assigned the highest priority level PN1. The telegram 31B is assigned the medium priority level PN2 and the telegram 31C the lowest priority level PN3. Furthermore, it can be seen that the priority level 30 of the telegram 31A was increased from operating cycle 32 to the subsequent operating cycle 33. In this case service A, for example, might be a service that sends and/or receives real-time telegrams and the telegram 31A might have been prioritized from operating cycle 32 to operating cycle 33 by a central network port 6.

The invention thus relates to a method for the prioritization of real-time telegrams in a convergent network 1, in particular in an industrial network and/or a "time-sensitive network" (TSN), wherein the convergent network 1 has at least one central distribution infrastructure 2 and at least one decentralized distribution infrastructure 12 and where in the convergent network 1 at least one service sends and/or receives real-time telegrams, and wherein the convergent network 1 has at least one switching node 10, which is a central network node 8 for the connection of central distribution infrastructure 2 and decentralized distribution infrastructure 12, and which has at least one coupling port 11 via which the switching node 10 is connected to the decentralized distribution infrastructure 12, where the switching node 10 has central network ports 6 via which the switching node 10 is integrated into the central distribution infrastructure 2. The real-time telegrams which are received at central network ports 6 of the switching nodes 10 are thus assigned a higher priority level 30 than the real-time telegrams which are received at the coupling ports 11 so as to provide the efficient prioritization of real-time telegrams.

Figure 4:
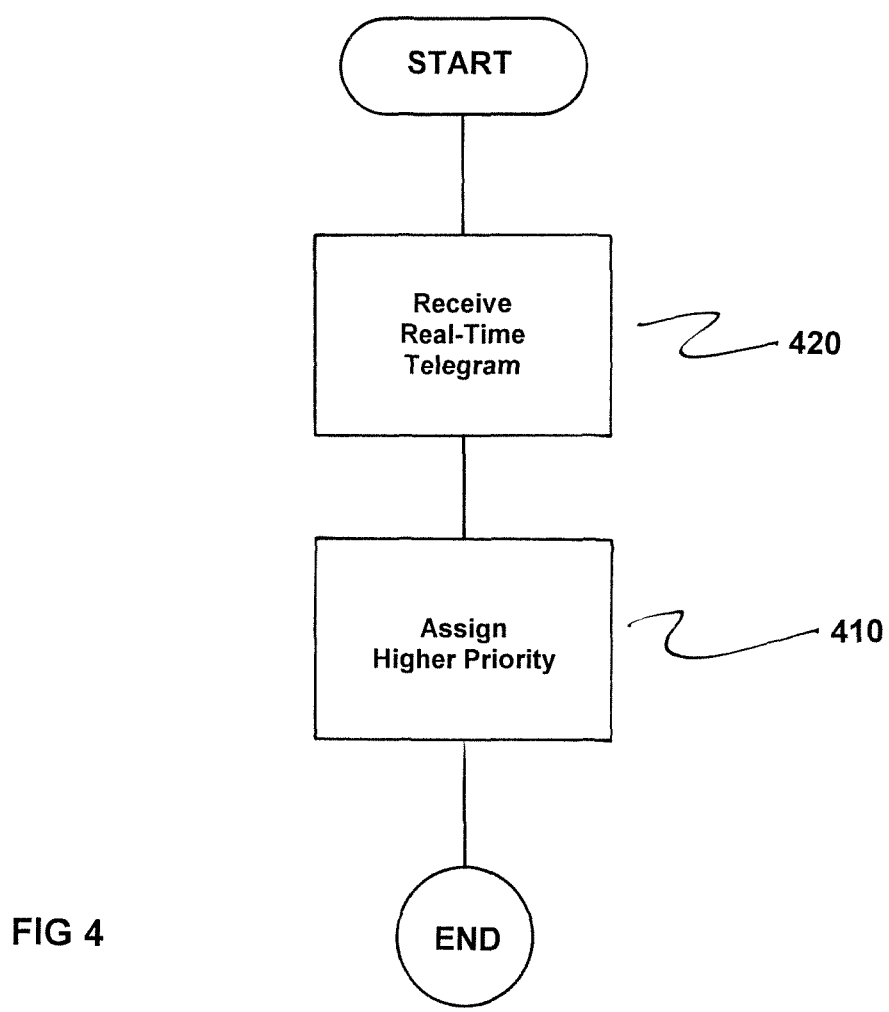
FIG. 4 is a flowchart of the method in accordance with the invention.

FIG. 4 is a flowchart of a method for the prioritization of real-time telegrams in a convergent network having at least one central distribution infrastructure and at least one decentralized distribution infrastructure, where at least one service in the convergent network either sends and/or receives real-time telegrams. In accordance with the invention, the convergent network also has at least one switching node that is a central network node for connecting central distribution infrastructure and decentralized distribution infrastructure, at least one coupling port by which the at least one switching node is connected to the at least one decentralized distribution infrastructure, and the switching node has central network ports via which the switching node is integrated into the central distribution infrastructure.

The method comprises receiving the real-time telegrams at a central network ports of the switching nodes, as indicated in step 410. Next, a higher priority level than real-time telegrams received at the coupling ports is assigned, as indicted in step 420.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for the prioritization of real-time telegrams in a convergent network having at least one central distribution infrastructure and at least one decentralized distribution infrastructure, at least one service in the convergent network at least one of sending and receiving real-time telegrams, the method comprising:

receiving the real-time telegrams at a central network port of the switching nodes within the at least one central distribution infrastructure, the convergent network including at least one switching node forming a central network node which interconnects the at least one central distribution infrastructure and the at least one decentralized distribution infrastructure and including at least one coupling port of the at least one switching node via which the at least one switching node is connected to the at least one decentralized distribution infrastructure, and the at least one switching node including central network ports via which the at least one switching node is integrated into the at least one central distribution infrastructure; and assigning a higher priority level than real-time telegrams received at the coupling ports of the at least one switching node within the at least one central distribution infrastructure such that the real-time telegrams in the convergent network having the at least one central distribution infrastructure and at least one decentralized distribution infrastructure are efficiently prioritized.

2. The method as claimed in claim 1, wherein the real-time telegrams received at the coupling ports are assigned a lower priority level than the real-time telegrams received at the central network port of the switching nodes within the at least one central distribution infrastructure.

3. The method as claimed in claim 2, wherein each real-time telegram at additional central network ports is assigned a higher priority level.

4. The method as claimed in claim 1, wherein each real-time telegram at additional central network ports is assigned a higher priority level.

5. The method as claimed in claim 1, wherein priority levels of the real-time telegrams are dynamically assigned.

6. The method as claimed in claim 5, wherein the assignment of the priority levels of the real-time telegrams is load-dependent.

7. The method as claimed in claim 1, wherein prioritization of the real-time telegrams is performed by a respective receiving network port.

8. The method as claimed in claim 1, wherein the convergent network is an industrial network.

9. A network arrangement performing the method as claimed in claim 1, wherein the network arrangement includes at least one central distribution infrastructure having at least one switching node; and at least one decentralized distribution infrastructure.

10. The network arrangement as claimed in claim 9, wherein the central distribution infrastructure essentially has a ring structure.

11. The network arrangement as claimed in claim 10, wherein the central distribution infrastructure essentially has a comb-like structure.

12. The network arrangement as claimed in claim 10, wherein the network arrangement one of (i) forms part of an industrial automation system and (ii) is connectable to the industrial automation system.

13. The network arrangement as claimed in claim 9, wherein the central distribution infrastructure essentially has a comb-like structure.

14. The network arrangement as claimed in claim 13, wherein the network arrangement one of (i) forms part of an industrial automation system and (ii) is connectable to the industrial automation system.

15. A network device for performing the method as claimed in claim 1, wherein the network device comprises one of a switch, hub, router, network adapter and network distributor.

* * * * *